(12) United States Patent
Welsh

(10) Patent No.: US 10,751,767 B2
(45) Date of Patent: Aug. 25, 2020

(54) METHOD OF CLEANING A THROAT SECTION OF A JET PUMP ASSEMBLY OF A NUCLEAR REACTOR

(71) Applicant: Christopher Martin Welsh, San Jose, CA (US)

(72) Inventor: Christopher Martin Welsh, San Jose, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 15/696,595

(22) Filed: Sep. 6, 2017

(65) Prior Publication Data

US 2019/0070642 A1 Mar. 7, 2019

(51) Int. Cl.
*B08B 9/032* (2006.01)
*B08B 9/043* (2006.01)
*B05B 1/16* (2006.01)
*G21C 15/25* (2006.01)
*B05B 13/06* (2006.01)
*B05B 15/652* (2018.01)
(Continued)

(52) U.S. Cl.
CPC .............. *B08B 9/0321* (2013.01); *B05B 1/16* (2013.01); *B05B 12/16* (2018.02); *B05B 13/0627* (2013.01); *B05B 15/652* (2018.02); *B08B 9/047* (2013.01); *B08B 9/0433* (2013.01); *G21C 15/25* (2013.01); *G21C 17/017* (2013.01); *F04F 5/46* (2013.01)

(58) Field of Classification Search
CPC . B08B 9/0321; B05B 13/0627; G21C 17/017; G21C 15/25
See application file for complete search history.

(56) References Cited

U.S. PATENT DOCUMENTS

| 5,418,824 A | 5/1995 | Monserud et al. |
| 6,622,941 B2 | 9/2003 | Ganoza et al. |

(Continued)

FOREIGN PATENT DOCUMENTS

| JP | H08-5773 A | 1/1996 |
| JP | 2000-035495 A | 2/2000 |

(Continued)

OTHER PUBLICATIONS

JP2007178191A Machine Translation (Year: 2007).*

(Continued)

*Primary Examiner* — Spencer E Bell
(74) *Attorney, Agent, or Firm* — Harness, Dickey & Pierce, P.L.C.

(57) ABSTRACT

A method of cleaning a jet pump assembly of a nuclear reactor may comprise inserting a cleaning tool into the jet pump assembly such that a front face of the cleaning tool is adjacent to an inner surface of the jet pump assembly and below a level of a first liquid in the jet pump assembly. The method may additionally comprise directing a plurality of front jets of a second liquid from a plurality of front orifices on the front face of the cleaning tool such that the plurality of front jets of the second liquid strikes the inner surface of the jet pump assembly. The method may further comprise maintaining a standoff distance between the front face of the cleaning tool and the inner surface of the jet pump assembly during the cleaning of the jet pump assembly.

10 Claims, 12 Drawing Sheets

(51) Int. Cl.
      *B05B 12/16*     (2018.01)
      *G21C 17/017*   (2006.01)
      *F04F 5/46*      (2006.01)
      *B08B 9/047*     (2006.01)

(56) References Cited

U.S. PATENT DOCUMENTS

| | | |
|---|---|---|
| 8,016,950 B2 | 9/2011 | Kim et al. |
| 2004/0131137 A1 | 7/2004 | Bernard |
| 2004/0131462 A1* | 7/2004 | Hawkins ............... F22B 37/006 |
| | | 414/745.3 |
| 2008/0264451 A1 | 10/2008 | Shimamura et al. |
| 2009/0223537 A1 | 9/2009 | Baron et al. |
| 2011/0194663 A1* | 8/2011 | Hori ........................ F16L 5/022 |
| | | 376/204 |

FOREIGN PATENT DOCUMENTS

| | | |
|---|---|---|
| JP | 2000-056070 A | 2/2000 |
| JP | 2006-292628 A | 10/2006 |
| JP | 2007-178191 A | 7/2007 |

OTHER PUBLICATIONS

Search Report for corresponding European Application No. 18191689.1 dated Feb. 11, 2019.
Search Report for European Application No. 18191687.5 dated Jan. 24, 2019.

\* cited by examiner

METHOD OF CLEANING A THROAT SECTION OF A JET PUMP ASSEMBLY OF A NUCLEAR REACTOR

BACKGROUND

Field

The present disclosure relates to methods of cleaning a jet pump assembly of a nuclear reactor.

Description of Related Art

FIG. 1 is a cutaway view of a conventional jet pump assembly in a reactor pressure vessel of a boiling water reactor (BWR). Referring to FIG. 1, a drive flow 102 of a motive fluid (liquid coolant outside the reactor pressure vessel) enters the inlet riser pipe 104 and flows upwardly to the inlet elbows 106. As the drive flow 102 is discharged downwards through the nozzles 108, an entrained flow 110 of suction fluid (liquid coolant inside the reactor pressure vessel) is drawn into the throat section 112 of the inlet mixer 114 and is mixed with the drive flow 102. The mixed flow continues downwardly to the diffusers 116 where the kinetic energy of the mixed flow is converted to pressure.

When the boiling water reactor is shut down for maintenance, the jet pump assembly still contains the liquid of the drive flow 102 and the entrained flow 110. As a result, the cleaning of the jet pump assembly typically involves disassembling it in order to permit adequate access to the desired surfaces for cleaning. While efforts have been made to clean the jet pump assembly without disassembling it, the ability to adequately clean the jet pump assembly remains a challenge in such a situation.

SUMMARY

A method of cleaning a jet pump assembly of a nuclear reactor may comprise inserting a cleaning tool into the jet pump assembly such that a front face of the cleaning tool is adjacent to an inner surface of the jet pump assembly and below a level of a first liquid in the jet pump assembly. The method may additionally comprise directing a plurality of front jets of a second liquid from a plurality of front orifices on the front face of the cleaning tool such that the plurality of front jets of the second liquid travel through the first liquid and strike the inner surface of the jet pump assembly. The method may further comprise maintaining a standoff distance between the front face of the cleaning tool and the inner surface of the jet pump assembly during the cleaning of the jet pump assembly.

The inserting of the cleaning tool may include connecting the cleaning tool to a bent wand and lowering the cleaning tool into a secondary inlet opening of the jet pump assembly via the bent wand.

The inserting of the cleaning tool may also include connecting the cleaning tool to a hose, mounting a manipulation tool on a rim of an inlet mixer of the jet pump assembly, and bending the hose and lowering the cleaning tool into a secondary inlet opening of the jet pump assembly via the manipulation tool.

The directing of the plurality of front jets may include forcing the second liquid onto a throat section of an inlet mixer of the jet pump assembly.

The directing of the plurality of front jets may also be performed at a pressure of at least 20,000 pounds per square inch.

The maintaining of the standoff distance may include driving the second liquid from a plurality of rear orifices on a rear face of the cleaning tool in a form of a plurality of rear jets to generate a reaction force to urge the front face of the cleaning tool toward the inner surface of the jet pump assembly.

The driving of the second liquid from the plurality of rear orifices may be performed such that side plates of the cleaning tool contact the inner surface of the jet pump assembly while the front face of the cleaning tool is spaced apart from the inner surface of the jet pump assembly.

The directing and the driving of the second liquid may be performed such that a ratio of the plurality of front jets to the plurality of rear jets ranges from about 1:1 to 1:2.

The inserting and the directing may be performed without disassembling the jet pump assembly.

A cleaning tool for removing deposits from a jet pump assembly of a nuclear reactor may comprise a spray head including a front face and a rear face. The front face defines anterior openings, and the rear face defines posterior openings. The cleaning tool may additionally comprise a removable orifice structure engaged with each of the anterior openings and the posterior openings. The cleaning tool may further comprise side plates secured to opposing end faces of the spray head. The side plates protrude beyond the front face to establish a standoff distance from the jet pump assembly during the removing of the deposits.

The front face may be a convex surface, and the rear face may be an opposing concave surface.

The removable orifice structure may be threadedly engaged with each of the anterior openings and the posterior openings.

The front face may define a quantity of anterior openings ranging from about 5 to 75.

The rear face may define a quantity of posterior openings ranging from about 5 to 75.

The side plates may protrude beyond the front face such that the standoff distance is about 0.5 inches or less during the removing of the deposits.

The side plates may be formed of a material having a Mohs hardness of 3 or less.

A system for cleaning the jet pump assembly of the nuclear reactor may comprise a cleaning tool and a bent wand connected to the cleaning tool. The bent wand is configured to position the cleaning tool within the jet pump assembly.

A system for cleaning the jet pump assembly of the nuclear reactor may also comprise a cleaning tool, a hose connected to the cleaning tool, and a manipulation tool configured to mount onto the jet pump assembly and to bend the hose to position the cleaning tool within the jet pump assembly.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
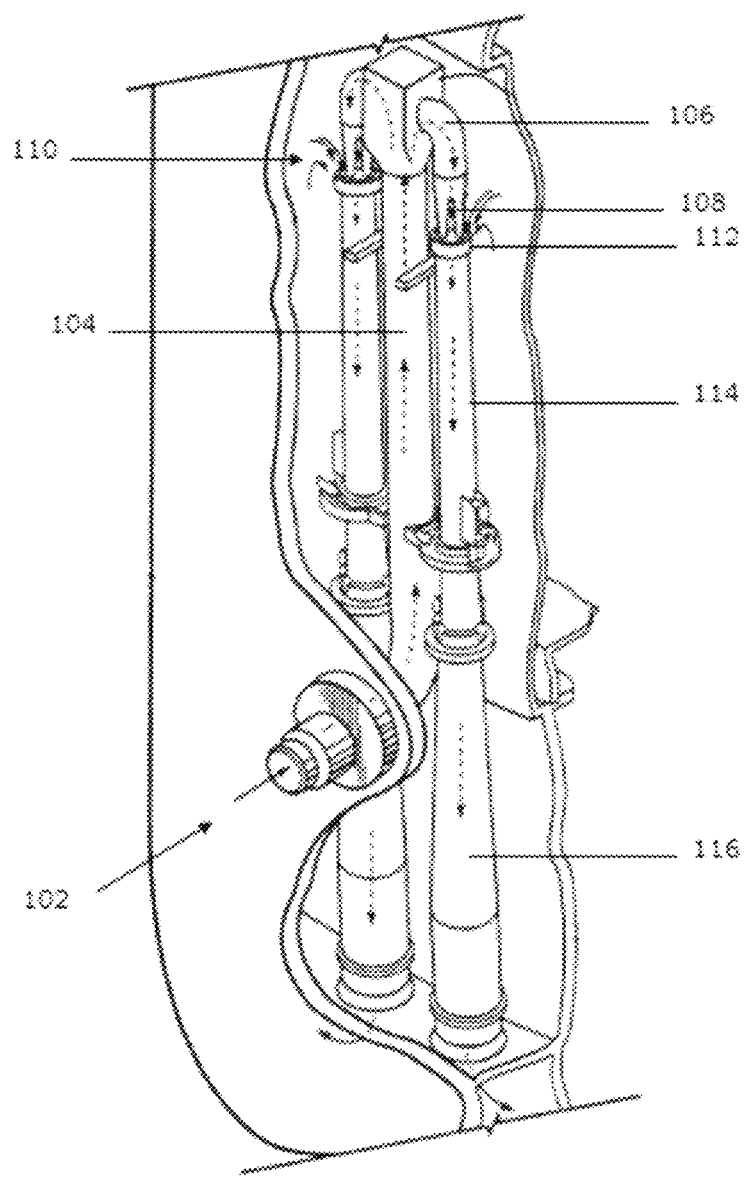
FIG. 1 is a cutaway view of a conventional jet pump assembly in a reactor pressure vessel of a boiling water reactor (BWR).

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
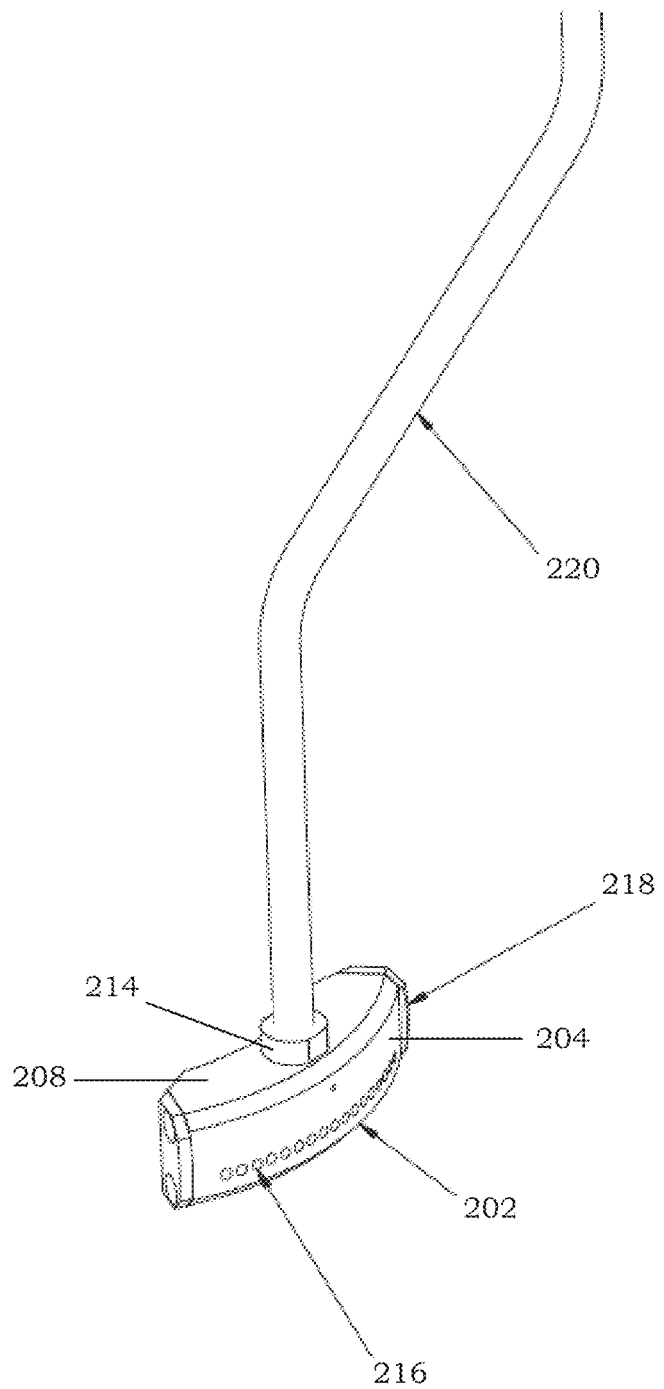
FIG. 2 is a perspective view of a system including a cleaning tool for a jet pump assembly according to an example embodiment.

FIG. 2 is a perspective view of a system including a cleaning tool for a jet pump assembly according to an example embodiment. Referring to FIG. 2, the system includes a cleaning tool 202 that is attached to a wand 220 via a connector 214. The wand 220 is a rigid, tubular structure that defines an internal passage configured to transport a fluid flow for cleaning the jet pump assembly. The cleaning tool 202 defines an internal space configured to receive the fluid flow from the wand 220 via the connector 214. The connector 214 may be a threaded connector, a bayonet connector, or other type of secure and releasable connector. Although the connector 214 is illustrated as being on the top face 208 of the spray head, it should be understood that example embodiments are not limited thereto.

The cleaning tool 202 includes a plurality of orifice structures 216 disposed on a front face 204 of the spray head. The orifice structures 216 are configured to transform the fluid flow exiting the front face 204 (during cleaning) into a plurality of high-pressure front jets. Each of the orifice structures 216 is designed to be an independent and removable component. In this regard, the orifice structures 216 can be changed as needed to adjust the cleaning pressure. For example, the orifice structures 216 may be structured to have externally-threaded surfaces that are configured to engage with internally-threaded openings in the front face 204.

A pair of side plates 218 is secured to opposing end faces of the spray head of the cleaning tool 202 to provide an appropriate standoff distance from a surface of the jet pump assembly during a cleaning of that surface. For instance, the side plates 218 may protrude beyond the front face 204 such that the standoff distance between the front face 204 and the surface being cleaned is about 0.5 inches or less. The side plates 218 are designed to be interchanged with differently-sized plates with relative ease to obtain the desired standoff distance. In addition, the front face 204 may be a convex surface that is dimensioned to correspond to a curved surface of a throat section of a jet pump assembly. As a result, a relatively uniform standoff distance may be provided during cleaning. Furthermore, the side plates 218 may be formed of a material having a Mohs hardness of 3 or less (e.g., aluminum). In such an instance, the occurrence of damage to the surface of the jet pump assembly being cleaned (e.g., from scraping by the side plates 218) may be reduced or prevented.

During a method of cleaning a jet pump assembly, the wand 220 allows the cleaning tool 202 to be introduced into and positioned within the jet pump assembly. In this regard, the wand 220 may include a first angled section and a second angled section to facilitate the maneuvering of the cleaning tool 202, although example embodiments are not limited thereto.

Figure 3:
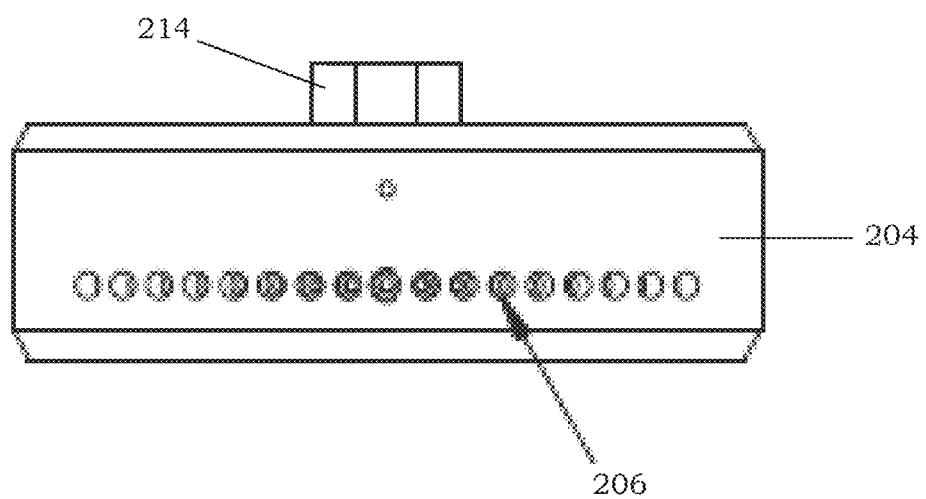
FIG. 3 is a front view of a spray head of a cleaning tool for a jet pump assembly according to an example embodiment.

FIG. 3 is a front view of a spray head of a cleaning tool for a jet pump assembly according to an example embodiment. Referring to FIGS. 2-3, the spray head 200 includes the connector 214 on its top face 208 and a plurality of anterior openings 206 in its front face 204. Although seventeen anterior openings 206 are shown, a different quantity may be provided. For instance, the front face 204 may define a quantity of anterior openings 206 ranging from about 5 to 75. In addition, rather than being arranged in a linear fashion, the anterior openings 206 may be arranged in a zig-zag manner, in rows (e.g., in an array), or in another suitable manner. When fully assembled, an orifice structure 216 will be engaged in each of the anterior openings 206, a side plate 218 will be secured to each of the opposing end faces of the spray head 200, and a wand 220 will be attached to the spray head 200 via the connector 214.

Figure 4:
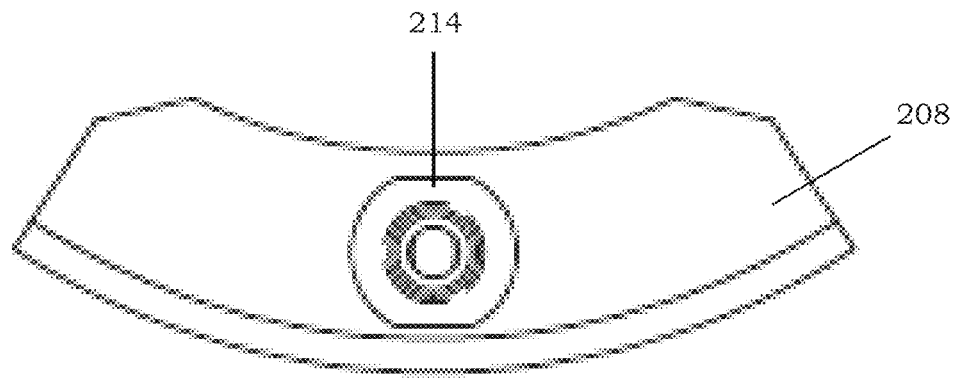
FIG. 4 is a top view of a spray head of a cleaning tool for a jet pump assembly according to an example embodiment.

FIG. 4 is a top view of a spray head of a cleaning tool for a jet pump assembly according to an example embodiment. Referring to FIGS. 2-4, the front face 204 is a convex surface, and the rear face is a concave surface. The curvature of the front face 204 and the rear face may be the same. As a result, the spray head 200 may resemble a section of an annular structure. Additionally, the connector 214 may be centered between the opposing end faces of the spray head 200.

Figure 5:
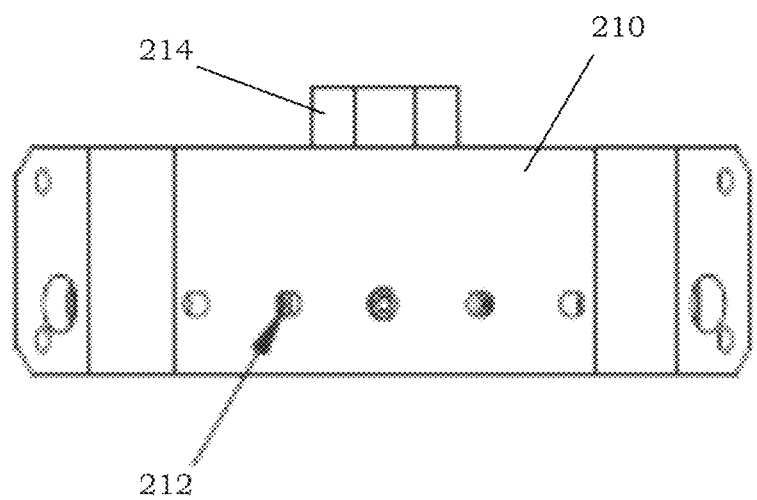
FIG. 5 is a rear view of a spray head of a cleaning tool for a jet pump assembly according to an example embodiment.

FIG. 5 is a rear view of a spray head of a cleaning tool for a jet pump assembly according to an example embodiment. Referring to FIGS. 2-5, in addition to the connector 214 being on the top face 208 of the spray head 200, the rear face 210 includes a plurality of posterior openings 212. Although five posterior openings 212 are shown, a different quantity may be provided. For instance, the rear face 210 may define a quantity of posterior openings 212 ranging from about 5 to 75. In addition, rather than being arranged in a linear fashion, the posterior openings 212 may be arranged in a zig-zag manner, in rows (e.g., in an array), or in another suitable manner. Furthermore, each of the posterior openings 212 is configured to receive an orifice structure (in a manner analogous to how each of the anterior openings 206 is configured to receive an orifice structure 216). The orifice structures engaged in the posterior openings 212 are configured to transform the fluid flow exiting the rear face 210 (during cleaning) into a plurality of high-pressure rear jets. The orifice structures engaged in the posterior openings 212 can be changed as needed to tune the reaction force.

Figure 6:
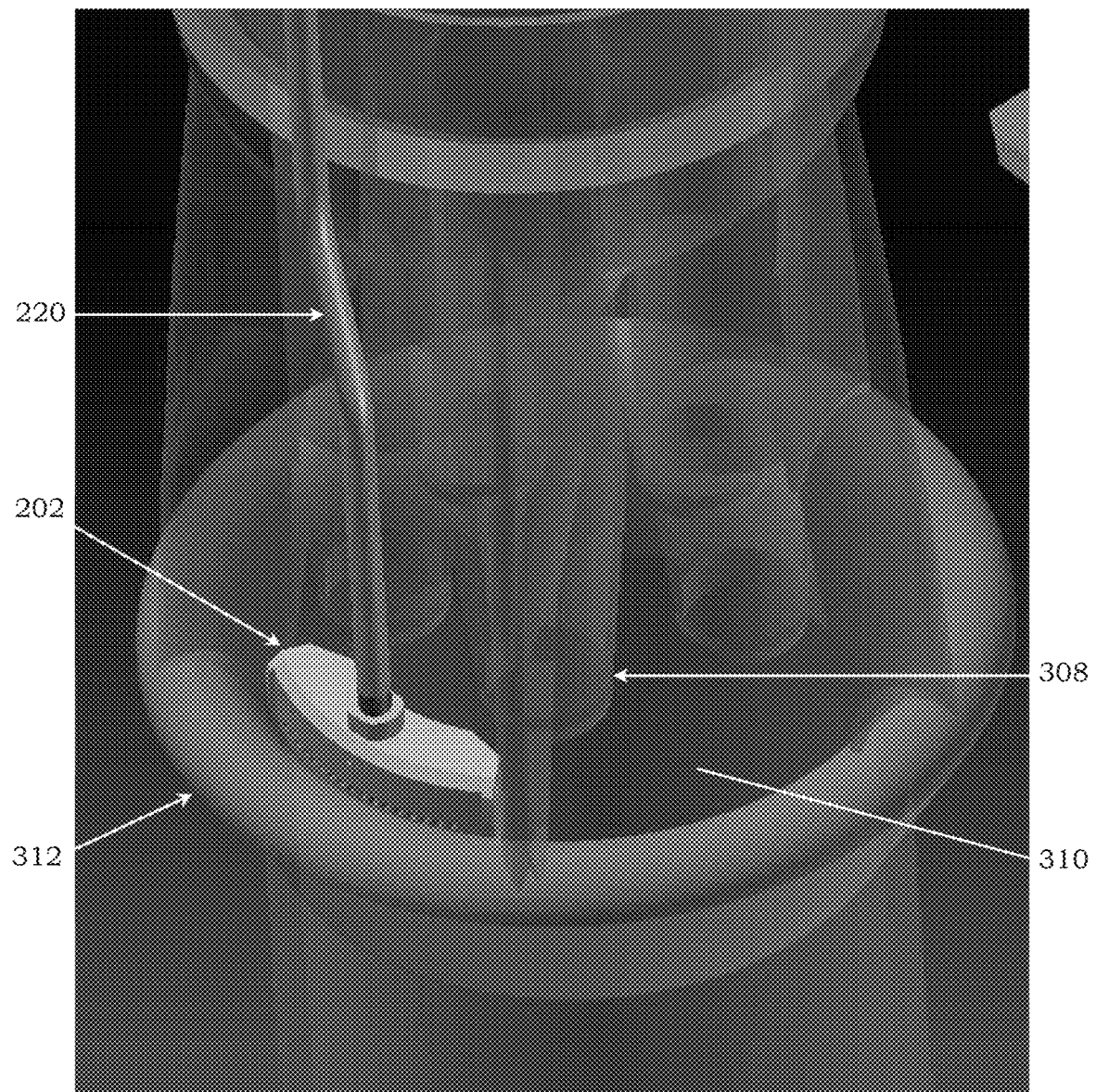
FIG. 6 is a transparent view of a jet pump assembly during a method of cleaning according to an example embodiment.

FIG. 6 is a transparent view of a jet pump assembly during a method of cleaning according to an example embodiment. Referring to FIGS. 2-6, the cleaning tool 202 may be inserted into the jet pump assembly via the wand 220 to clean the throat section 312. Access to the inner surface of the jet pump assembly may be achieved by inserting the cleaning tool 202 into an inlet opening 310 (e.g., secondary inlet opening) between the nozzles 308 and the throat section 312. The cleaning tool 202 can be manufactured in a variety of sizes depending on the size of the inlet opening 310.

The wand 220 may be handled manually by a plant operator to maneuver the cleaning tool 202. With regard to the orientation of the cleaning tool 202, the front face 204 is designed to face the inner surface of the throat section 312 of the jet pump assembly. Additionally, the contours of the front face 204 are structured to correspond to the curvature of the inner surface of the throat section 312. When properly positioned, the side plates 218 of the cleaning tool 202 will contact the inner surface of the throat section 312 so as to provide an appropriate standoff distance. In this manner, the cleaning tool 202 can be lowered into the throat section 312 (and raised) via the wand 220.

Figure 7:
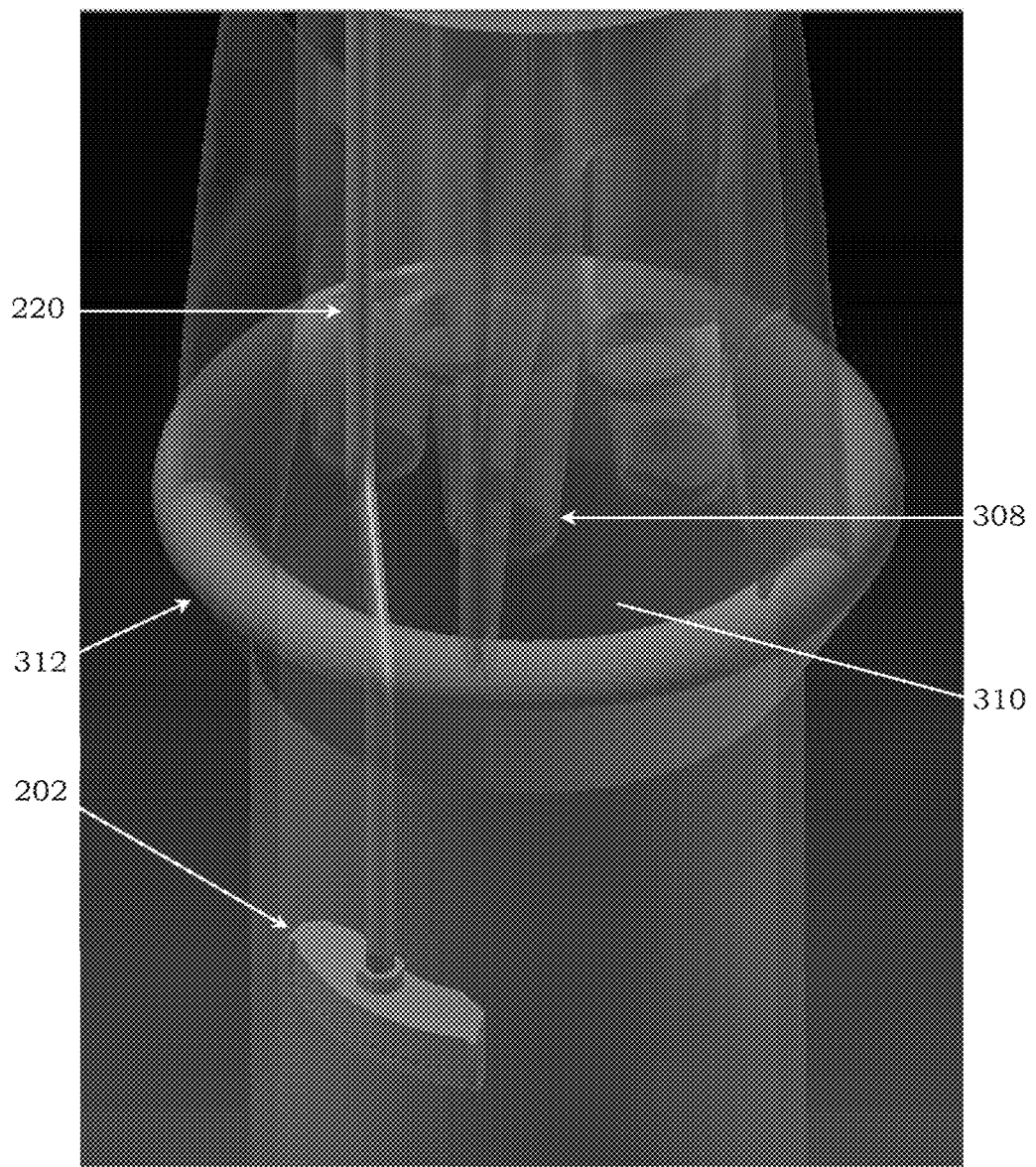
FIG. 7 is another transparent view of a jet pump assembly during a method of cleaning according to an example embodiment.

FIG. 7 is another transparent view of a jet pump assembly during a method of cleaning according to an example embodiment. Referring to FIGS. 2-7, the cleaning tool 202 has been inserted into the inlet opening 310 of the jet pump assembly and lowered into the throat section 312 via the wand 220. In this lowered position, the cleaning tool 202 may be submerged below a level of a first liquid in the jet pump assembly.

During cleaning, a flow of a second liquid through the wand 220 is expelled from the orifice structures 216 in the front face 204 of the cleaning tool 202 in the form of front jets that travel through the first liquid and strike the inner surface of the throat section 312. Additionally, the second liquid is also expelled from the orifice structures in the rear face 210 of the cleaning tool 202 in the form of rear jets that generate a reaction force to urge the front face 204 toward the inner surface of the throat section 312. Consequently, the side plates 218 of the cleaning tool 202 will be pushed against the inner surface of the throat section 312. The side plates 218 of the cleaning tool 202 allow an appropriate standoff distance between the front face 204 and inner surface of the throat section 312 to be maintained during the cleaning.

A pressure of at least 20,000 pounds per square inch may be used to generate the plurality of front jets from the front face 204 and/or the plurality of rear jets from the rear face 210 of the cleaning tool 202. The requisite pressure may be supplied by a pumping system. The ratio of the plurality of front jets to the plurality of rear jets may range from about 1:1 to 1:2. According to an example embodiment, the method of cleaning can be performed without disassembling the jet pump assembly, thereby conserving time and costs.

Figure 8:
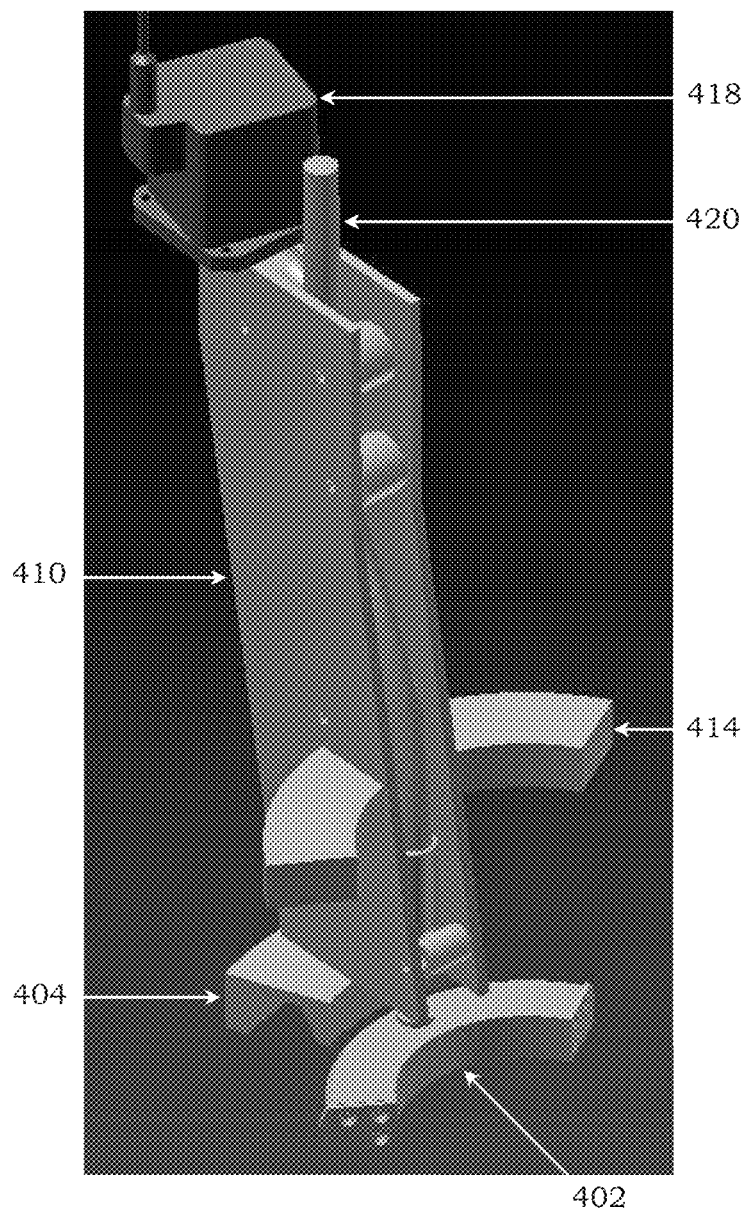
FIG. 8 is a perspective view of a system including a manipulation tool used in a method of cleaning according to an example embodiment.

FIG. 8 is a perspective view of a system including a manipulation tool used in a method of cleaning according to an example embodiment. Referring to FIG. 8, a cleaning tool 402 is connected to a hose 420 as part of a system for cleaning a jet pump assembly. The hose 420 defines an internal passage configured to transport a fluid flow for cleaning the jet pump assembly. The cleaning tool 402 defines an internal space configured to receive the fluid flow from the hose 420. Aside from some variances as to size and shape, the cleaning tool 402 may be as described in connection with the cleaning tool 202.

Although the hose 420 may be more flexible than the wand 220 (e.g., in FIG. 2), the hose 420 is still relatively stiff and awkward to manipulate by hand. Accordingly, a manipulation tool may be used to bend and move the hose 420 in order to maneuver the cleaning tool 402 in and out of the jet pump assembly. The manipulation tool includes a base 404 that is configured to clamp onto a portion of the jet pump assembly. A pair of body plates 410 is secured to the base 404, and an arrangement of rollers is provided between the body plates 410 to interact with the hose 420. A motor 418 is configured to drive at least one of the rollers. An arm 414 is also secured to each of the body plates 410 to help brace the manipulation tool against the jet pump assembly.

Figure 9:
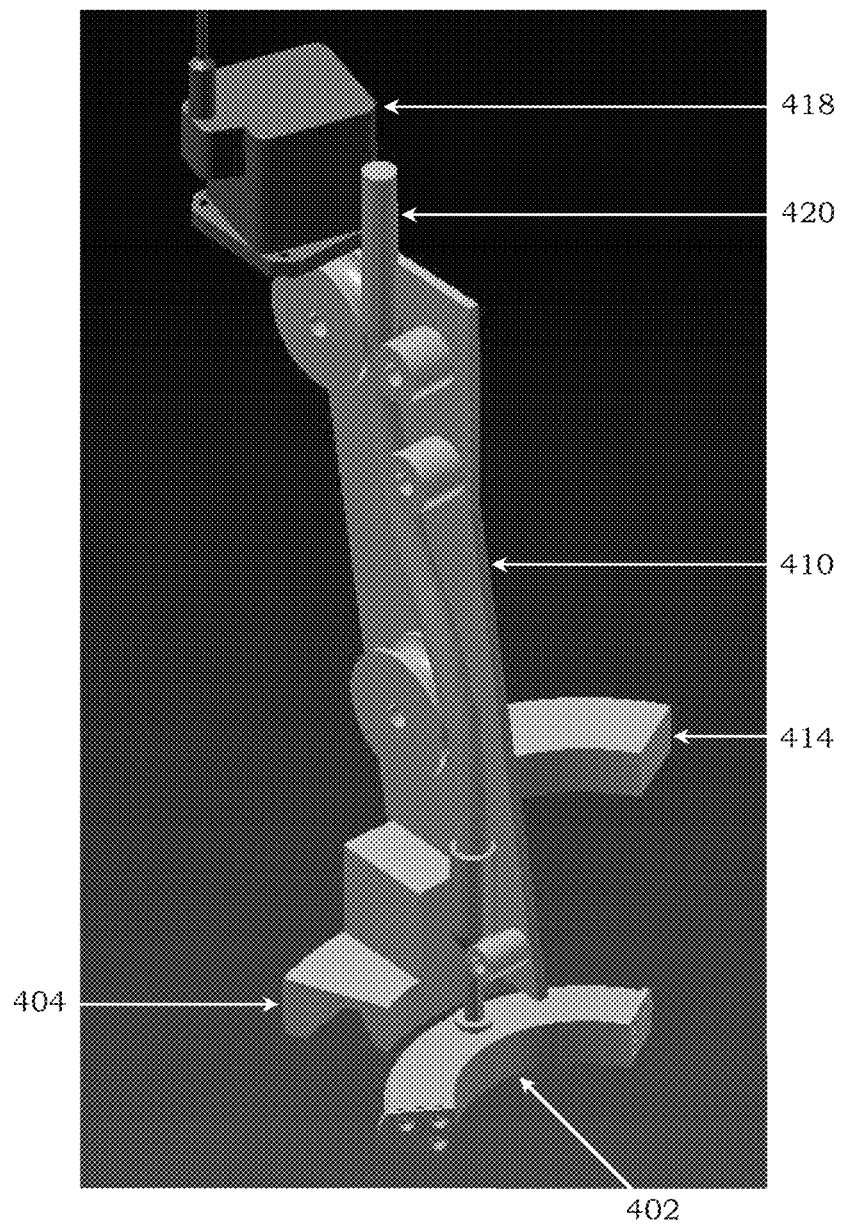
FIG. 9 is another perspective view of a system including a manipulation tool used in a method of cleaning according to an example embodiment.

FIG. 9 is another perspective view of a system including a manipulation tool used in a method of cleaning according to an example embodiment. Referring to FIG. 9, one of the body plates 410 of the manipulation tool has been removed to show the arrangement of rollers used to interact with the hose 420. The arrangement of rollers is configured guide the hose 420 and, thus, the cleaning tool 402 from the raised position (shown) to a lowered position within the jet pump assembly during cleaning.

Figure 10:
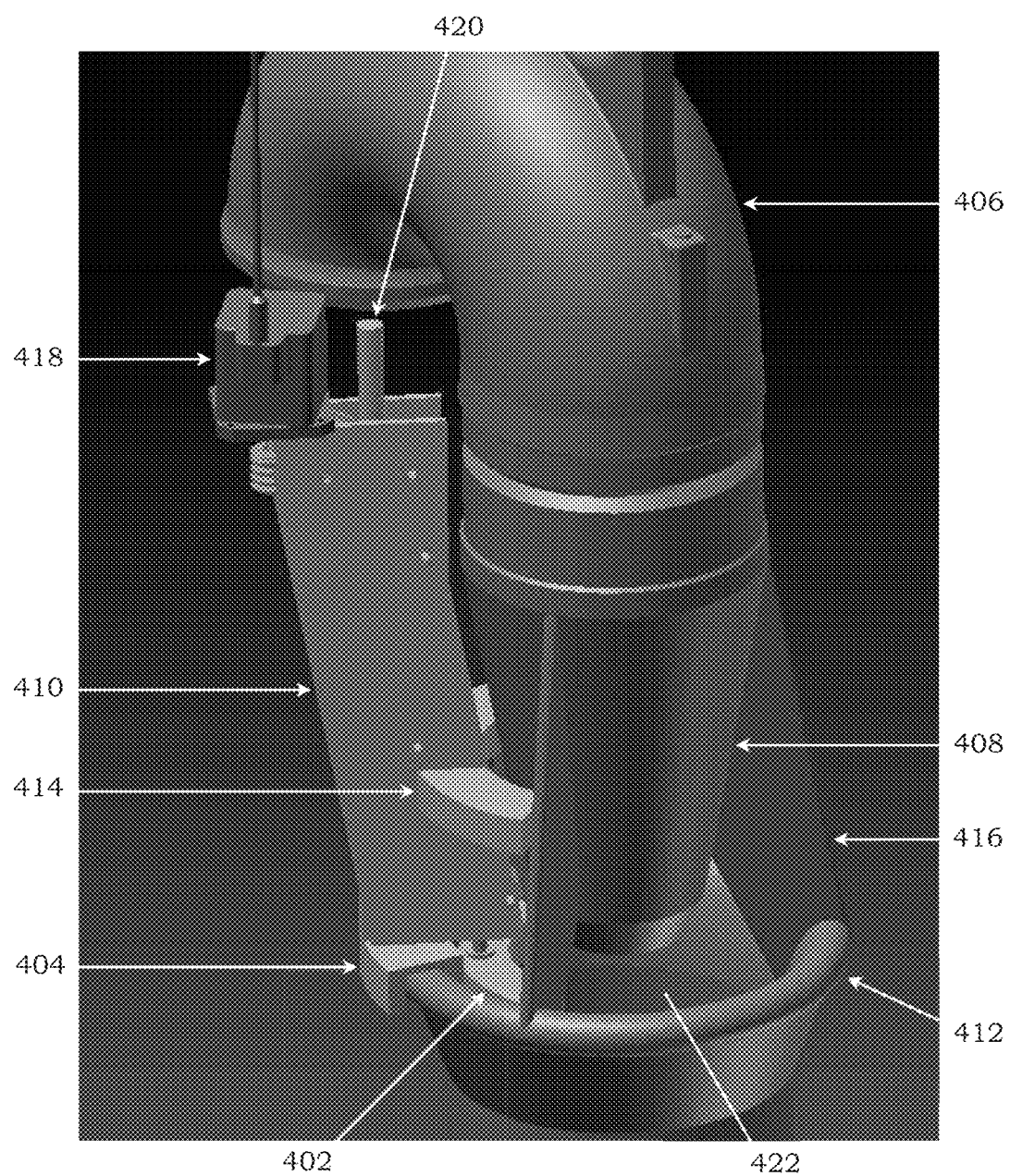
FIG. 10 is a perspective view of a jet pump assembly during a method of cleaning using a manipulation tool according to an example embodiment.

FIG. 10 is a perspective view of a jet pump assembly during a method of cleaning using a manipulation tool according to an example embodiment. Referring to FIG. 10, a manipulation tool is mounted on a jet pump assembly that is to be cleaned. For the mounting, the base 404 may be clamped onto the rim of the throat section 412. In addition, the arms 414 may help brace the manipulation tool against the supports 416 (which are connected to the nozzle 408 and the throat section 412). The edge of the body plates 410 adjacent to the inlet elbow 406 and the nozzle 408 may also be contoured to reduce or prevent the potential for interference when mounting the manipulation tool. The cleaning tool 402 will be in the raised position (shown) when the manipulation tool is being mounted or moved. During cleaning, the motor 418 will drive the arrangement of rollers to move the hose 420 downwards to allow the cleaning tool 402 to descend from the inlet opening 422 to a lower position within the throat section 412.

Figure 11:
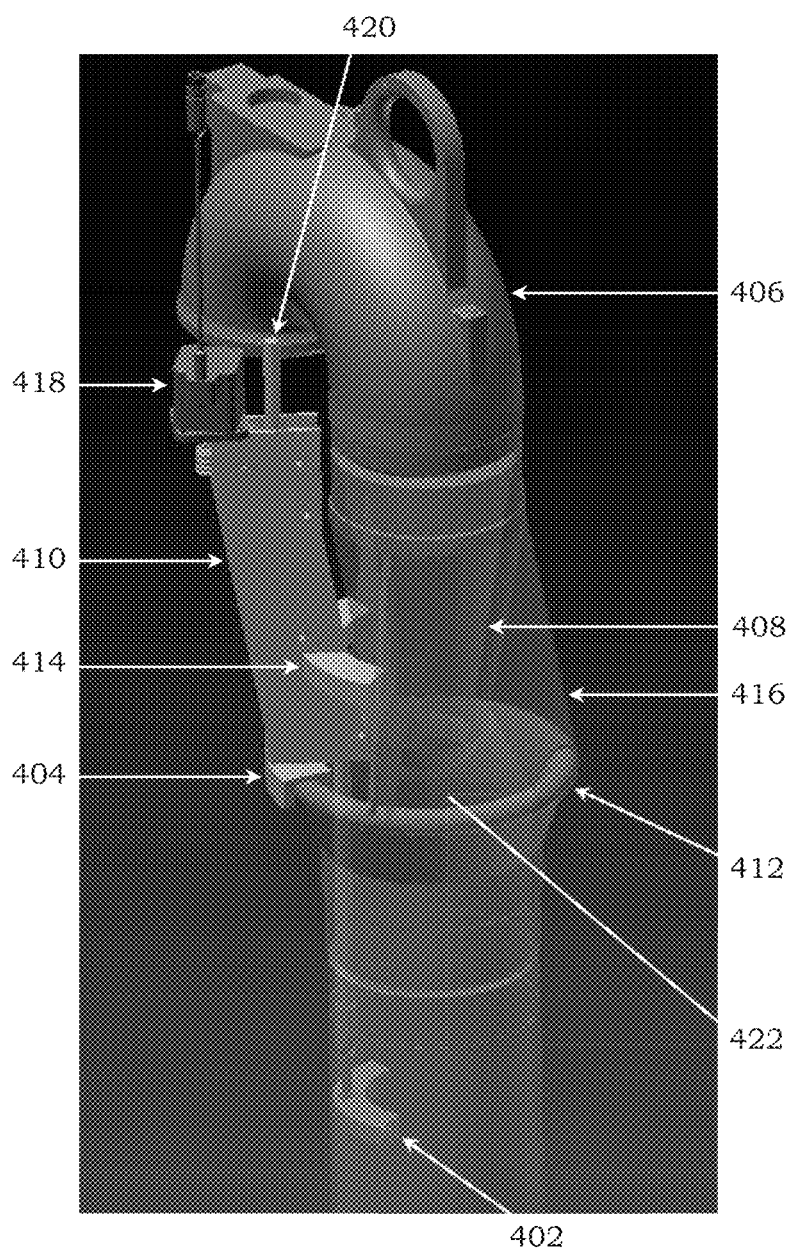
FIG. 11 is another view of a jet pump assembly during a method of cleaning using a manipulation tool according to an example embodiment.

FIG. 11 is another view of a jet pump assembly during a method of cleaning using a manipulation tool according to an example embodiment. Referring to FIG. 11, the cleaning tool 402 is in a lowered position, which may be below a level of a first liquid within the throat section 412. During the cleaning, a second liquid is supplied through the hose 420 and expelled from the cleaning tool 402 in the form of front jets that strike the inner surface of the throat section 412 (e.g., to remove deposits) and rear jets that urge the side plates of the cleaning tool 402 against the throat section 412 to maintain the appropriate standoff distance. The motor 418 is controlled to drive the arrangement of rollers in a manner that extends or retracts the hose 420 in order to access and clean the targeted inner surfaces of the throat section 412. Once a targeted section of the jet pump assembly is clean, the cleaning tool 402 can be returned to the raised state, and the manipulation tool can be moved and mounted on a different part of the rim of the throat section 412 in order to access other surfaces to be cleaned. Accordingly, the requisite cleaning can be performed without disassembling the jet pump assembly.

Figure 12:
FIG. 12 is a photograph of a throat section of a mock-up of a jet pump assembly after a method of cleaning according to an example embodiment.

FIG. 12 is a photograph of a throat section of a mock-up of a jet pump assembly after a method of cleaning according to an example embodiment. Referring to FIG. 12, a coating used to simulate oxide deposits was substantially removed with the method of cleaning discussed herein.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A cleaning tool for removing deposits from a jet pump assembly of a nuclear reactor, comprising:
    a spray head including a front face and a rear face, the front face defining anterior openings, the rear face defining posterior openings;
    a removable orifice structure engaged with each of the anterior openings and the posterior openings; and
    side plates secured to opposing end faces of the spray head, the side plates protruding beyond the front face to establish a standoff distance from the jet pump assembly during the removing of the deposits.

2. The cleaning tool of claim 1, wherein the front face is a convex surface, and the rear face is an opposing concave surface.

3. The cleaning tool of claim 1, wherein the removable orifice structure is threadedly engaged with each of the anterior openings and the posterior openings.

4. The cleaning tool of claim 1, wherein the front face defines a quantity of anterior openings ranging from about 5 to 75.

5. The cleaning tool of claim 1, wherein the rear face defines a quantity of posterior openings ranging from about 5 to 75.

6. The cleaning tool of claim 1, wherein the side plates protrude beyond the front face such that the standoff distance is about 0.5 inches or less during the removing of the deposits.

7. The cleaning tool of claim 1, wherein the side plates are formed of a material having a Mohs hardness of 3 or less.

8. A system for cleaning the jet pump assembly of the nuclear reactor, comprising:
    the cleaning tool of claim 1; and
    a bent wand connected to the cleaning tool and configured to position the cleaning tool within the jet pump assembly.

9. A system for cleaning the jet pump assembly of the nuclear reactor, comprising:
    the cleaning tool of claim 1;
    a hose connected to the cleaning tool; and
    a manipulation tool configured to mount onto the jet pump assembly and to bend the hose to position the cleaning tool within the jet pump assembly.

10. The cleaning tool of claim 1, wherein the front face of the spray head is between the side plates.

* * * * *